United States Patent [19]
Retter

[11] Patent Number: 5,825,362
[45] Date of Patent: Oct. 20, 1998

[54] GRAPHICAL USER INTERFACE WITH KEYBOARD DISPLAY GRAPHICAL

[75] Inventor: Dale Retter, Scottsdale, Ariz.

[73] Assignee: DataHand Corporation, Phoenix, Ariz.

[21] Appl. No.: 852,594

[22] Filed: May 7, 1997

[51] Int. Cl.⁶ .............. G06F 3/14; G06F 3/023; G06F 3/00
[52] U.S. Cl. .......... 345/357; 345/352; 345/168
[58] Field of Search .................. 345/156, 168, 345/172, 352, 357

[56] References Cited

U.S. PATENT DOCUMENTS

| | | | |
|---|---|---|---|
| 4,913,573 | 4/1990 | Retter | 345/163 X |
| 5,123,088 | 6/1992 | Kasahara | 345/357 |
| 5,181,029 | 1/1993 | Kim | 345/172 X |
| 5,187,797 | 2/1993 | Nielsen | 345/338 |
| 5,367,625 | 11/1994 | Ishitani | 345/333 |
| 5,442,746 | 8/1995 | Barrett | 345/357 |
| 5,491,495 | 2/1996 | Ward et al. | 345/173 |
| 5,581,243 | 12/1996 | Oullette et al. | 345/173 |
| 5,605,406 | 2/1997 | Bowen | 345/168 X |
| 5,694,562 | 12/1997 | Fisher | 345/349 |

*Primary Examiner*—Raymond J. Bayerl
*Assistant Examiner*—Chadwick A. Jackson
*Attorney, Agent, or Firm*—LaValle D. Ptak

[57] ABSTRACT

A method and system for controlling the operation of a digital computer system having a memory, visual display, and keyboard employs software for displaying a graphical user interface (GUI) in the form of representations of successive tasks. This display is effected in a format which contains, in part, an unchanging representation of at least a core plurality of the keys of the keyboard used with the digital computer system. This representation is displayed in the same arrangement used on the keyboard. The GUI then further indicates within the unchanging representation of the core plurality of keys, a dynamically changeable function representation of the functions to be performed upon operation of the corresponding one of the displayed keys. This changeable function representation changes in a hierarchal sequence in response to successive operations of selected ones of the keys, as indicated on the visual display of the GUI.

14 Claims, 8 Drawing Sheets

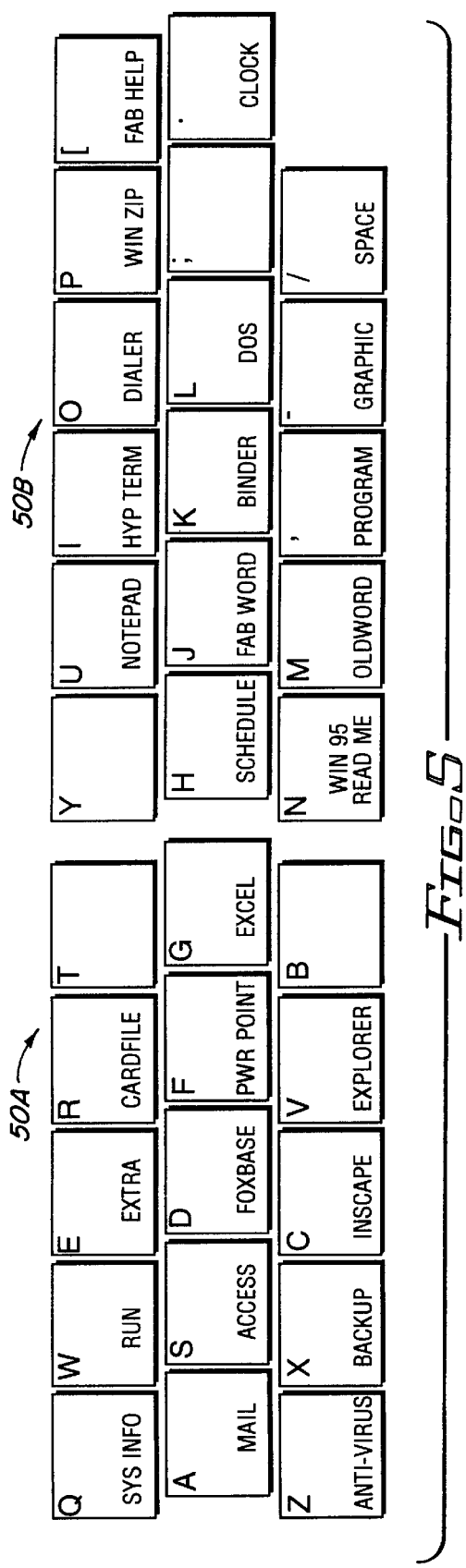
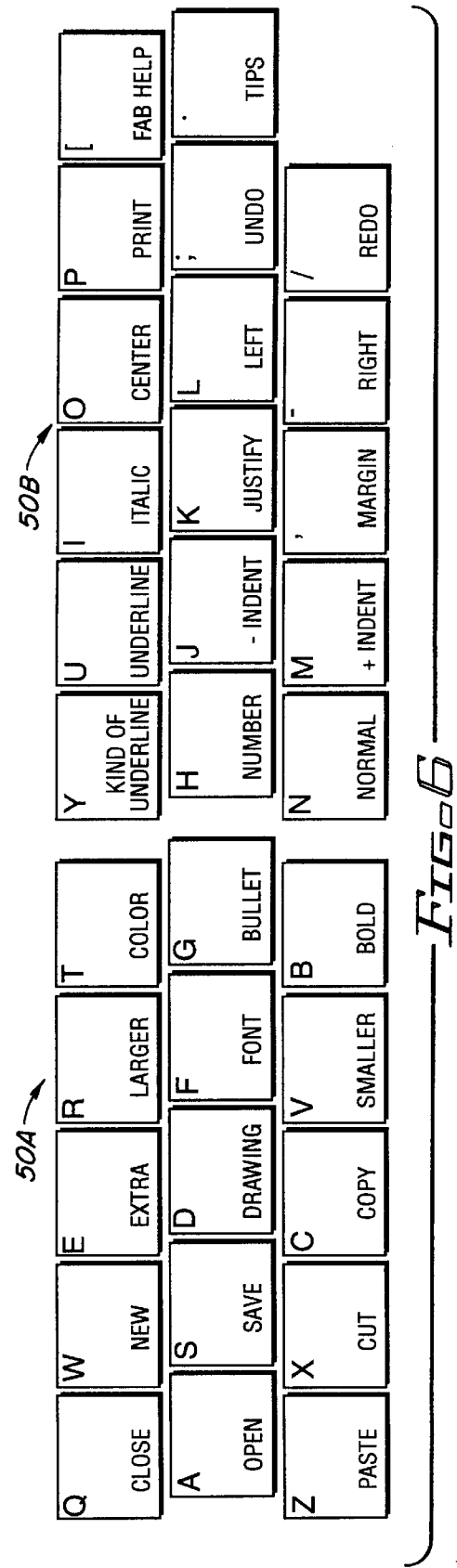
FIG. 5
FIG. 6

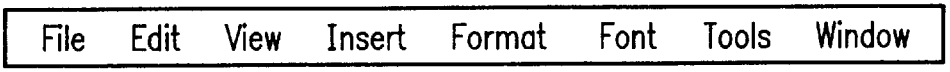
FIG. 15
FIG. 16
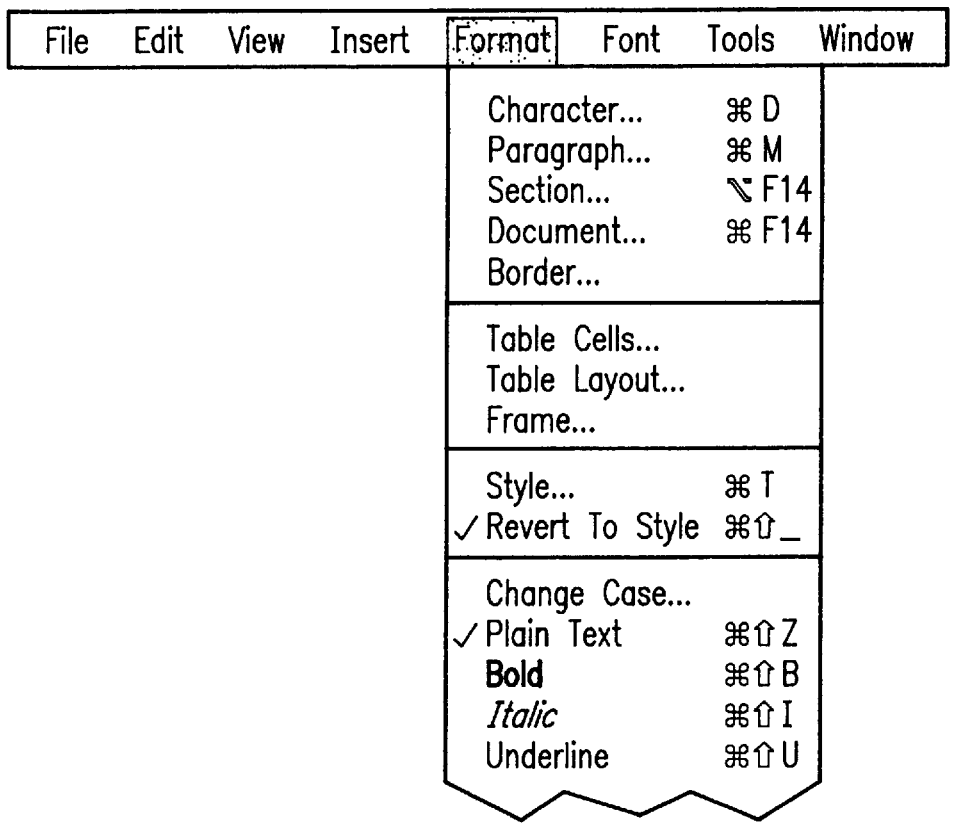

GRAPHICAL USER INTERFACE WITH KEYBOARD DISPLAY GRAPHICAL

BACKGROUND

In the development of personal computers, significant changes have been made in the manner in which control of the operating systems is effected. Initially, software and computer interfaces were typified by text-command based operating systems. Such systems still are widely employed. In such systems, precise commands are required to be typed by the operator or developed from macros selected by the operator in order to effect the desired operation. For example, to delete a file from disk memory in a text-command based operating system, the operator may be required to type a precise text command like: >A:D\DEL FILES LETGEO. This is how most computer code was written, for almost all computers, including mainframe computers.

The MS DOS® operating system, which originally was developed by Microsoft Corporation for IBM, soon became the standard operating system for personal computers. In subsequent years, micro computers (PCs) have become economically and numerically the largest part of the computer world; and all of these computers employing the MS DOS® system originally required text-command inputs for effecting the system operation.

The MacIntosh® computer developed by Apple Computer and Windows® systems which have been employed with the IBM compatible personal computers use a graphical user interface (GUI) for enabling a user to effect the operating commands necessary for manipulating and operating the computer. From an end user standpoint, GUIs offer many important advantages over text-command based interfaces. With a GUI, a user wishing to delete a file identifies an "icon" (an on-screen graphic representation) of a file with a label, for example, "LETTER TO GEORGE" and simply clicks on it with a mouse-driven on-screen pointer device. Following this operation, the file icon then is moved by manipulating the mouse to an icon representation of a garbage can or the like. An additional click or operation of the mouse then deletes the file. This type of operation has the advantage of being more intuitive, not requiring that exact command names and command structures be typed in a precise manner, and that the exact complete file name needs to be remembered by the operator. It has become apparent that for the majority of computer users, GUIs have largely displaced the older command-based operating systems. This is evident by the overwhelming popularity of such interface systems in the current market.

GUIs also have replaced command-based operating systems at the operating system level and at the computer control level (where the operator does things outside of specific applications, such as selecting the application to be activated). GUIs also have replaced the command-based operating systems within most of the most popular software applications. For example, in spreadsheet programs, it is common to "grab" an on-screen image of a vertical line which determines the width of a column and move the line to make the column wider or narrower. This is effected through manipulation of the mouse control device, and is called a GUI manipulation. In contrast, to effect the same operation, in a command based structure, the user might have to type a sequence such as "FORMAT COLUMN: 14 WIDTH=9". Clearly, for users faced with the possibility of large numbers of different commands and formats within different programs, and for users who infrequently need to apply operating commands, such GUI systems have clear advantages. As a consequence, GUI interfaces have succeeded in replacing text-command interfaces despite the fact that the older text-command interfaces have been heavily entrenched in the market, and despite the fact that GUI interfaces generally require significantly more expensive hardware to accommodate them.

Current GUI interfaces also frequently operate on a sequential or hierarchal set of displays. Almost all GUI interfaces are developed by software which places a list of menu items at the top of or in an application window, as displayed on the display screen of the computer. Some of these menu items are what may be termed "navigator" items, which sequentially lead (on a screen-by-screen or display-by-display basis) to the particular task or software set-up which is desired for the operation to be undertaken. Thus, the first screen presents the operator with menu headings or selections, typically labeled with words or words and symbols. By manipulation of the cursor controls on the computer or, more commonly, by manipulation of the mouse, one of these menu items is selected. Operation of the mouse then selects that item and a new screen in the sequence or hierarchy is presented. The operator then visually scans the screen and moves the cursor or selection by means of the mouse to the desired menu item on this screen. Successive operation of the screens, the number of which varies in accordance with the ultimate task to be performed, are effected in this manner.

Four patents which are directed to GUI interfaces employing hierarchal display screens are the U.S. Pat. Nos. to Neilsen No. 5,187,797; Barrett No. 5,422,746; Kasahara No. 5,123,088 and Ishitani No. 5,367,625. All of these patents disclose hierarchal screens for the display; and in each of them it is necessary to move the cursor or a mouse to manipulate a pointer to the position corresponding to the display in order to effect the command selection. Although the displays illustrated in each of these patents differ, all of them are essentially a common GUI interface of the type employed for many different programs used with a variety of micro computers or PCs.

A problem in such displays arises when a large number of selections may be possible on any displayed screen of the GUI. For example, in a word processing system, if a user desires to cause a particular word or section to be printed in a "bold" typeface, the user first must select the word, with a mouse or cursor manipulation, and then go to the menu headings in order to act on the selected word. Thus, in the opening menu, the operator may not now if the desired command is a sub-menu item of "format" or "font" if these are two of the several menu items displayed on the initial opening screen. A common experience for many. GUI users involves selecting the wrong choice and then reviewing a list of a number of commands (perhaps a dozen or more) appearing below the "wrong" command heading. Once the user realizes that the desired "task" is not located within this heading, the user then is required to make a second choice and select the next menu candidate heading. Again, the next screen in the hierarchy presents a new list of commands. The desired command could be anywhere in a long list. Once it is found, however, manipulation of the mouse to place the pointer icon or cursor in the proper position and then operation of the mouse selects that function, as desired. For many GUI displays, a "key-able" command sequence also is displayed. Such a command usually involves operation of two or three key sequences or simultaneous key operations as an alternative technique for directly accessing frequently used commands.

Most operators do not use the "short cut" command sequences the majority of the time, because these sequences are both hard to remember and also require the operators to take their eyes off the screen to hunt and peck keys like the function keys, for example, "F-6", which cannot be touch-typed. Given these difficulties, usually it is easier for an operator to keep his or her eyes on the screen and use the mouse control pointer to select, graphically, the command desired. Typically, this is accomplished by using the mouse to move the on-screen pointer down from the vertical column of commands until the desired command is reached at the horizontal level and then release or click a mouse button.

Even after the operator has visually located the correct command in the column, it takes time to use the mouse to maneuver the pointer over the command and then select it. Often, operators in an attempt to reduce the "travel time" move the mouse so fast that they overshoot the command and have to back up the mouse to the proper position in order to effect the desired selection.

It is desirable to provide an improved graphic user interface which overcomes the disadvantages of the prior art and which provides a more natural and direct manner of effecting the command selections necessary for causing the desired computer operation.

SUMMARY OF THE INVENTION

It is an object of this invention to provide an improved graphic user interface system and method.

It is another object of this invention to provide an improved graphic user interface system and method correlated to the data input device used with a computer.

It is an additional object of this invention to provide an improved graphic user interface system and method for a computer which correlates operation directly with the keyboard of the computer, eliminating the necessity of using a spatial input device such as a mouse.

It is a further object of this invention to provide an improved method and system for a graphic user interface display and operation for a computer in which the display is directly correlated to keys on the computer for operation by computer keys to effect selected menu functions.

In accordance with a preferred embodiment of the invention, a graphic user interface (GUI) for controlling the operation of a digital computer system is employed. The computer system includes a digital computer, a memory, a visual display and a keyboard. A graphic user interface (GUI) displays user schematics of successive tasks to be performed on the visual display of the computer in a format which contains, in part, an unchanging representation of at least a core plurality of the keys of the keyboard in the same arrangement used on the keyboard. A second portion of the GUI indicates, within the displayed unchanging representation of the core plurality of keys, a dynamically changeable function representation of functions which may be performed upon operation of corresponding ones of the keys of the keyboard. The changeable function representation changes in a hierarchal sequence in response to successive operations of selected ones of the keys which correspond to the displayed function locations.

BRIEF DESCRIPTION OF THE DRAWINGS

FIGS. 4, 5, 6, 7, 8, 9, 10, 11 and 12 are hierarchal representations of displays of changeable function representations overlaid on the unchanging display of FIG. 3;

FIG. 15 is a menu heading for a common word process program.

FIG. 16 is a vertical presentation of a list of commands generated when a menu candidate is selected.

DETAILED DESCRIPTION

Figure 1:
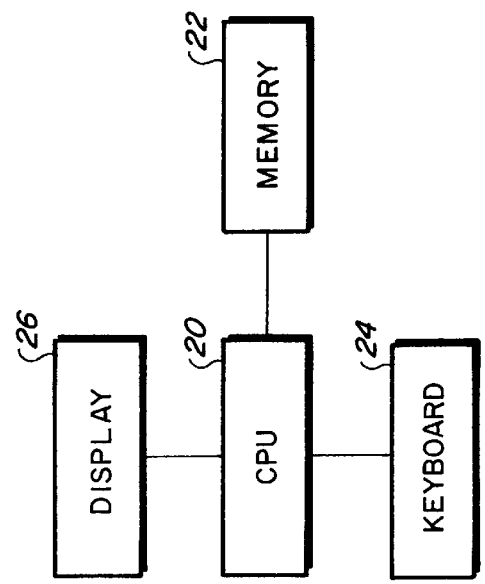
FIG. 1 is a block diagram of a system of the type with which the preferred embodiment of the invention is used.

Reference now should be made to the drawings, in which the same reference numbers are used throughout the different figures to designate the same components. Reference first should be made to FIG. 1. This figure is a diagrammatic representation of a typical PC system. It includes a central processing unit (CPU) 20 coupled with a memory 22 and a visual display 26. A data entry device, shown as a keyboard 24, is used to input information to the CPU 20. The visual display 26 typically is a CRT or other commonly used display. The system of FIG. 1 is a standard system configuration, and may be used in conjunction with other peripheral equipment such as modems, printers, facsimile machines and the like. The present invention is designed to work with such standard personal computer (PC) configurations and is not dependent upon any particular operating system or the specific details of the computer system.

Figure 2:
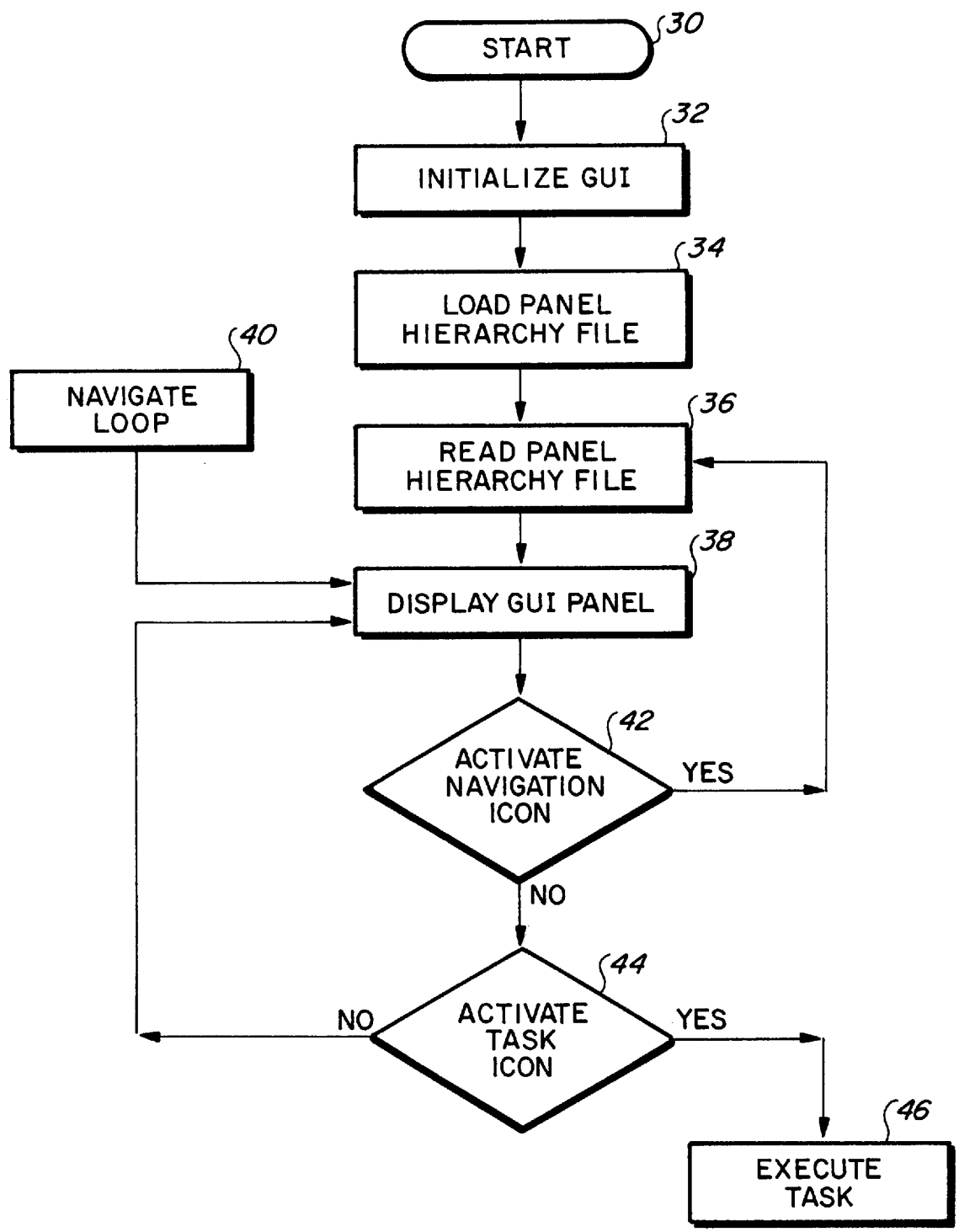
FIG. 2 is a flow chart illustrating the steps of operation of a preferred embodiment of the invention.

FIG. 2 is a flow diagram illustrating the manner in which the graphic user interface (GUI) of the present invention functions in conjunction with the system of FIG. 1 to implement applicant's invention. This flow diagram is comparable to flow diagrams of conventional prior art hierarchal GUI systems of the type which display icons for contact with a pointer or cursor and display lists for selection through the operation of a spatial input device (such as a mouse), or the like. An important advantage of applicant's invention, described in conjunction with the remaining figures of this application, is that it does not require any different operational steps of the computer system of FIG. 1 than have been employed in the past. The preferred embodiment of the however, implements the operating sequences in an entirely different manner from what has been used in the past.

In FIG. 2, the flow diagram for operating the GUI functions with the computer system of FIG. 1 is shown. Whenever a GUI function is to be initiated it is started at 30 and initialized at 32, as indicated in FIG. 2. Two operational capabilities are provided by the GUI shown in FIG. 2. The first of these capabilities is to navigate from one panel to another; and the second is the capability to execute specific tasks.

After the GUI program is initialized at 32, a panel hierarchy file is loaded at 34 into the memory 22 of FIG. 1. This file is conventional for the particular system involved, and contains data representing the graphic definitions of the tasks, icons and panels, and includes the hierarchy structure which is to be employed for the program being operated. At this time, the first or root panel is displayed on the display screen 26 of the system shown in FIG. 1; and this display is shown at 38 in FIG. 2. Typically, this display is a navigation display and navigation icons are displayed. The navigation loop or operation is effected at 40. In applicant's system, this operation is effected through the keyboard 22 in contrast with prior art systems. Whenever a navigation loop operation is effected at 40, the panel represented by the selection of that icon is retrieved from the hierarchy file and displayed on the screen 26 of FIG. 1 at 38 (FIG. 2). It should be noted that for a simple GUI representation, the root or "navigation" panel may be the only panel; so that there would be no further need for navigation icons in this case, but all of the icons in that panel then would be task icons.

Whenever a navigation icon is activated at 42, the loop repeats, as shown in FIG. 2; and the new panel hierarchy file is read at 36 and displayed at 38. If no further navigation icons are activated as shown in FIG. 42, the next panel is a task icon panel which is displayed on the display panel at 38, as shown in FIG. 2. If there is no activation of the task icon, the loop repeats at the GUI panel 38. When a task icon is selected, however, the hierarchy file which has been loaded into the memory 22 is read; and the task is executed at 46. The system shown in FIG. 1 then accomplishes the desired execution and operation to effect the task selection in a conventional manner. As a consequence, no further description of these procedures is considered necessary, since the manner in which the computer system of FIG. 1 functions to carry out these navigation and task selections is standard.

Before entering into a discussion of the preferred embodiment GUI display and operation which is shown in FIGS. 3 through 14, a brief review of the commonly used current GUI interfaces is considered helpful. Currently, almost all GUI software place a list of menu items at the top of an application window for display on the visual display device 26 of the computer system. By way of example, a common word processing program (Microsoft WORD®) has eight menu headings labeled with words as depicted in FIG. 15.

If the user desires to make an individual word appear "bold", the user first selects the word with the mouse, and then goes to the menu headings to act on the selected word. This initial menu heading may be considered to be a "navigation" heading for opening up subsequent hierarchy files leading to the ultimate task. In the present example, the operator may not know if the desired command is a submenu item of FORMAT or FONT. A common experience for many GUI users involves selecting the wrong choice with the mouse and then seeing a list of a dozen or more commands appearing below the wrong command heading. If the correct command is not found, the user then must make a second guess and select a new menu candidate.

Whenever a menu candidate from the main menu headings is selected, however, the screen presents a list of commands. When this is done, the screen presents the commands in a vertically arranged list, as shown graphically in FIG. 16.

As can be seen from the above list, the heading "BOLD" is found on the list. As shown, it is the thirteenth entry in a list of a total of 22 commands. Also, as is evident from the above list, there is a "keyable" command sequence indicated. Such shortcut key sequences are made available by many software providers as an alternative way to access directly frequently used commands. These key sequences are shown to the right of each of the plain text commands in the list. Many operators do not use these "shortcut" command sequences much of the time, because they are hard to remember and it is necessary for the operator to take his or her eyes off the screen to hunt and peck keys, like the function keys, which cannot be touch typed. Usually, it is easier for an operator to keep his or her eyes on the screen and to use the mouse control pointer to graphically select the command "BOLD". Typically, this is accomplished by using the mouse or other spatial input device to move the on-screen pointer down the vertical column of commands until the desired command is reached. Then the mouse button is clicked or released. Even after the operator has visually located the correct command in the column, it takes time to use the mouse to maneuver the pointer over the command and to select it. Frequently, operators in an attempt to reduce this "travel time" move the mouse so fast that they over shoot the command and have to back up the mouse.

In contrast to this current conventional technique for operating hierarchal navigation and task files in a GUI, the preferred embodiment of applicant's invention provides a GUI which significantly differs from the one shown above. A preferred embodiment of this GUI is illustrated in FIGS. 2 through 12 in conjunction with a specific software program. It should be noted, however, that the basic underlying principles of applicant's new GUI display and operation are applicable to any commonly used program which is implemented in conjunction with a GUI interface. The GUI format illustrated in conjunction with a specific example, as shown in FIGS. 2 through 12, readily may be adapted to any program having a GUI feature.

Figure 3:
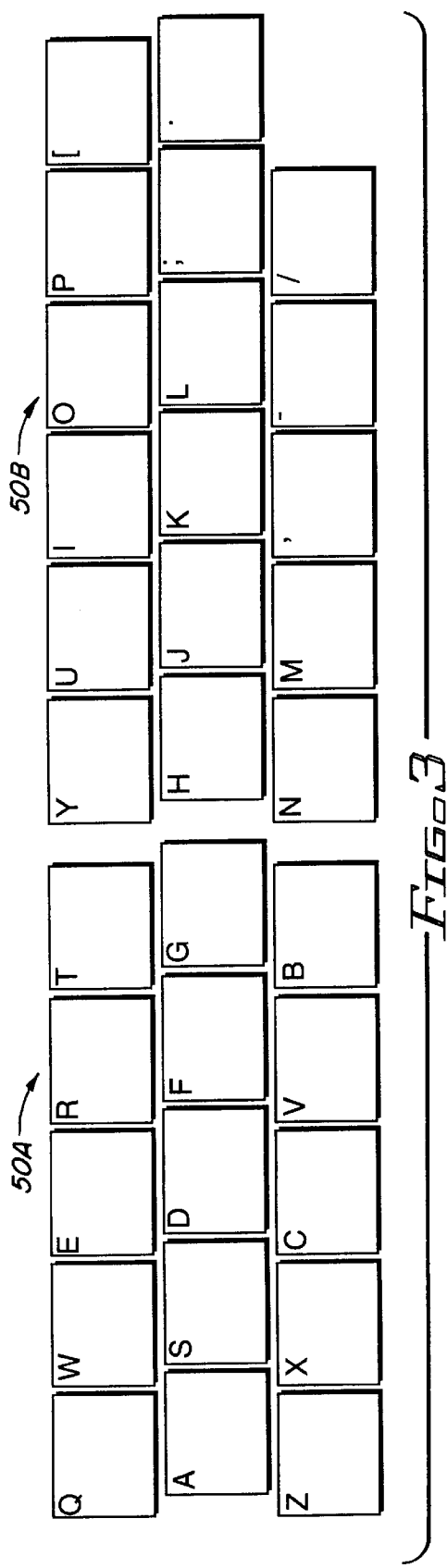
FIG. 3 is a visual display configuration of a basic, unchanging display used in conjunction with a preferred embodiment of the invention.

Reference now should be made to FIG. 3. This figure illustrates the GUI display of a preferred embodiment of the invention as used in conjunction with a computer system using a standard QWERTY keyboard 24 of the type commonly employed with most PCs today. This portion of the display is an unchanging portion, which, for a standard keyboard 24, appears in conjunction with each of the various display screens of the hierarchy of any particular set of programs installed in the computer system of FIG. 1. As illustrated, the unchanging display of FIG. 3 includes two portions 50A and 50B. These portions are separated slightly from one another at the center of the display, as shown in FIG. 3, and constitute a representation of the core keys or basic character keys used with a conventional typewriter/computer input keyboard. In the upper left-hand corner of each of the display squares constituting the various portions of the unchanging display 50A and 50B, the designation of the corresponding key found on the keyboard 24 is made. It is readily apparent that this is a representation of the basic three rows of keys, arranged in the same arrangement as used on the standard keyboard 24, with the same key designations being placed on each of the keys in the upper left-hand corners as are used in the normal typing of characters and punctuation. It has been found that the thirty-two key representations which form the two portions 50A and 50B are sufficient for hierarchal displays of navigation functions and task functions for programs commonly run on PC systems. It is important to note that the display layout corresponds exactly to the keyboard layout; so that the operator visualizing the display on the screen 26 essentially sees a "picture" of a portion of the keyboard 24 for the computer used in conjunction with this GUI display.

Figure 4:
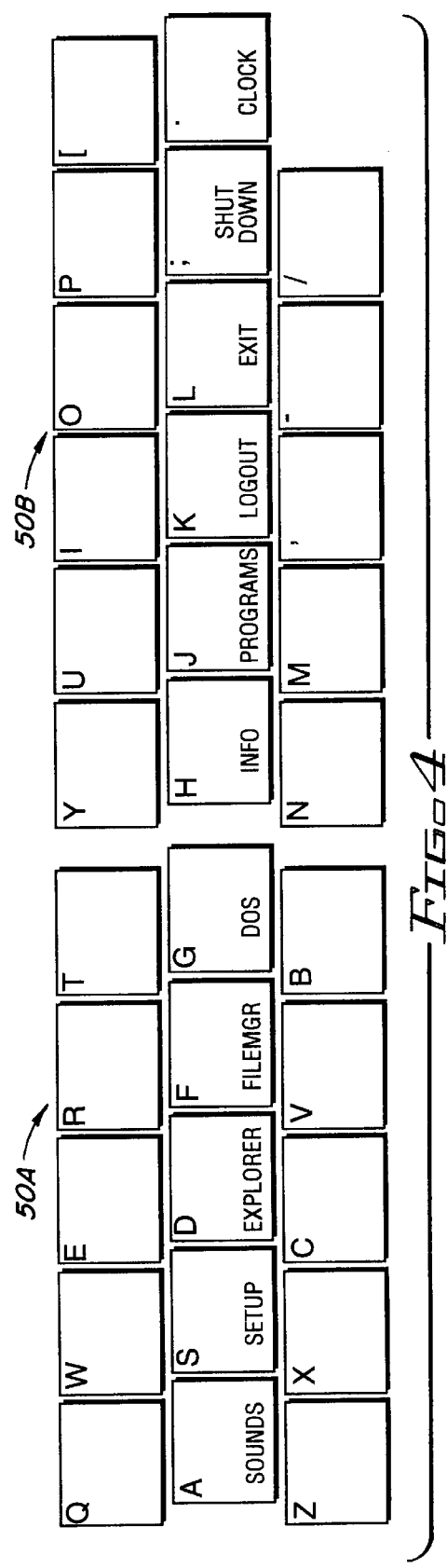

The variable portions of the GUI display then are superimposed over the unchanging portion or basic portion shown in FIG. 3. Thus, an opening screen for a typical PC computer is shown in FIG. 4. When the GUI initialization is made, the screen of FIG. 4 now appears on the display 26 of the system shown in FIG. 1. A typical implementation of the various operations which may be effected through use of the GUI of this preferred embodiment of the invention are illustrated in FIG. 4. Such an opening display typically includes a number of high level tasks for initialization by the computer operator. In the illustrated example, only the center row of the unchanging portion of the display of FIG. 3 includes variable information in the display of FIG. 4. This information is indicated on the row of keys in the two groups 50A and 50B extending from left to right, as "SOUNDS", "SETUP", "EXPLORER", "FILE MGR", "DOS", "INFO", "PROGRAMS", "LOGOUT", "EXIT", "SHUT DOWN" and "CLOCK". In addition to these words, which appear as part of the GUI, icons commonly associated with these functions, and used in conjunction with many PCs today, also may appear in the blank portions of the key representations. It also is important to note that all of the unchanging key representations which appear in the upper left-hand corner of the display shown in FIG. 3 also continue to appear in the display of FIG. 4.

In order to select any one of the functions to move to the next panel in the hierarchy file, the operator of the computer system associated with this GUI interface depresses the associated key on the keyboard 24 which directly corresponds with the "key" displayed in the GUI panel of FIG. 4. A direct visual correlation with the touch-type ability of the typist is involved here. There is no need to remove the hands from the keyboard to operate a mouse to move a pointer or cursor to select the desired operation. Because the operation of applicant's GUI system functions in the same manner irrespective of the particular hierarchal path chosen, the illustration which follows is specifically shown for a particular path of navigation and task activation associated with the Microsoft WORD® program. It should be noted, however, that the basic manner in which the GUI system operates is the same with any program, or with any one of the hierarchal selections which may be made.

In the present illustration, assume that the operator desires to open the computer for a particular program. To do this, the key associated with the letter "J" on the keyboard (FIG. 1) would be operated, since, in the display of FIG. 4, this is the GUI representation of the "program" selection step in the hierarchy. Operation of this key then causes a display, as shown in FIG. 5, of all of the programs which are loaded into the particular computer system of the type shown in FIG. 1. These programs also each are associated with individual ones of the keys of the core key group shown in the unchanging portion of the display of FIG. 3. The information shown in FIG. 4 is removed; and the new hierarchy panel of FIG. 5 is displayed, with the word identification of each of the various programs and, in most cases, an icon (not shown) representation also in the blank space shown in FIG. 5. The actual icon representations are not shown in the various figures, since these can be varied with different applications and since to do so in the drawings would unnecessarily clutter the drawings. It should be understood, however, that visual representations as well as the word representations appear in some or all of the rectangular sections of the display 50A and 50B whenever a new hierarchal panel is displayed. FIG. 5 illustrates a number of programs (selected by way of example) which may be associated with the computer system of FIG. 1. These programs are shown for purposes of illustration only; and any number of programs or different ones of these programs associated with other programs may be installed in any particular computer system. Most computer systems, however, do use a large number of different programs for different purposes; and the panel display of FIG. 5 may be considered as a typical panel.

When the computer operator sees the display of FIG. 5, the next step is to select the desired program which the operator wishes to use. To do this, depression of the corresponding key on the keyboard 24 associated with that program from the visual display of FIG. 5 can be made. The selection is directly associated with the finger and key position of a standard computer keyboard 24 in accordance with the display; and when the corresponding key is operated, the next panel in the hierarchy file is selected, in the same manner as described above in conjunction with FIG. 4. Again, it should be noted that no need exists for removal of the hands from the standard positions on the keyboard 24. There is no need to remove a hand to operate a spatial input device, such as a mouse and a pointer. The function selection via the GUI is natural and straightforward in the normal operation of the keyboard 24 of the computer system in order to select the next stage in the hierarchy file.

For purposes of illustration, assume that the program selected is the program "FABWORD". As is readily apparent from an examination of FIG. 5, this is selected by operation of the key associated with the letter "J" on the keyboard 24. When this is done, the next display panel, shown in FIG. 6, is presented on the visual display 26 of the computer system of FIG. 1. The GUI panel of FIG. 6 includes a number of tasks indicated by the text shown in each of the rectangular representations of FIG. 6. Some of these tasks are of a type which would not be undertaken at this early stage in operation of the program, but do include operations which may appear in subsequent utilization of the selected program. For the present example, assume that the next step which is to be made is to select a color for presentation of the operation of the program. As is evident from an examination of FIG. 6, operation of the key "T " on the keyboard 24, as displayed on the representation of that key in the GUI panel of FIG. 6, moves the GUI system to the next panel in the hierarchy, as shown in FIG. 7.

Figure 7:
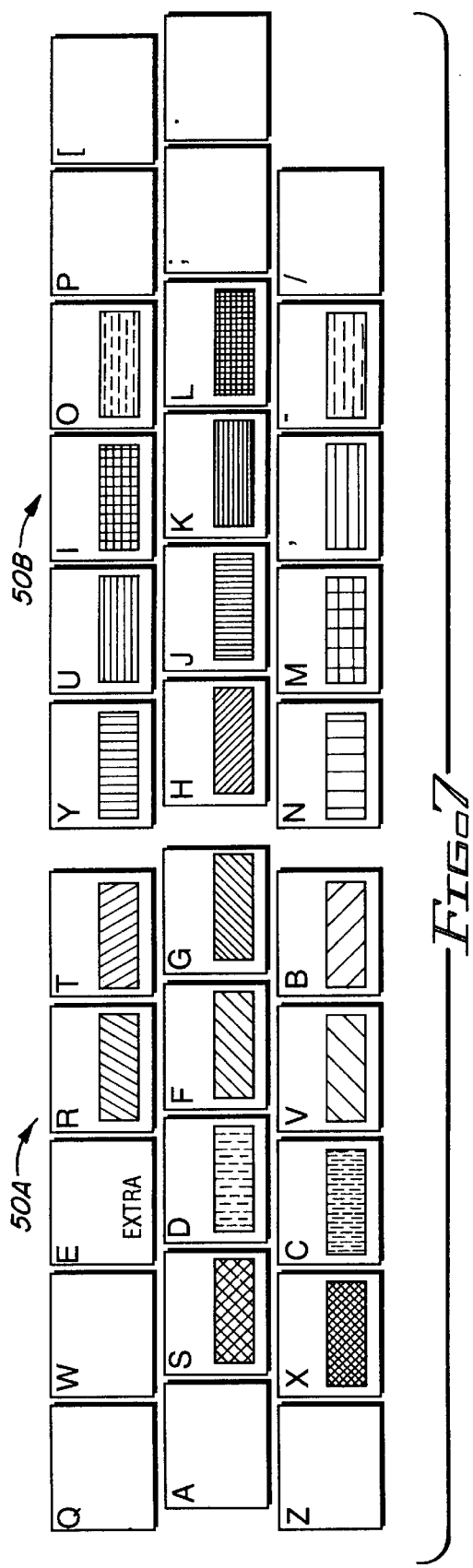
Figure 8:
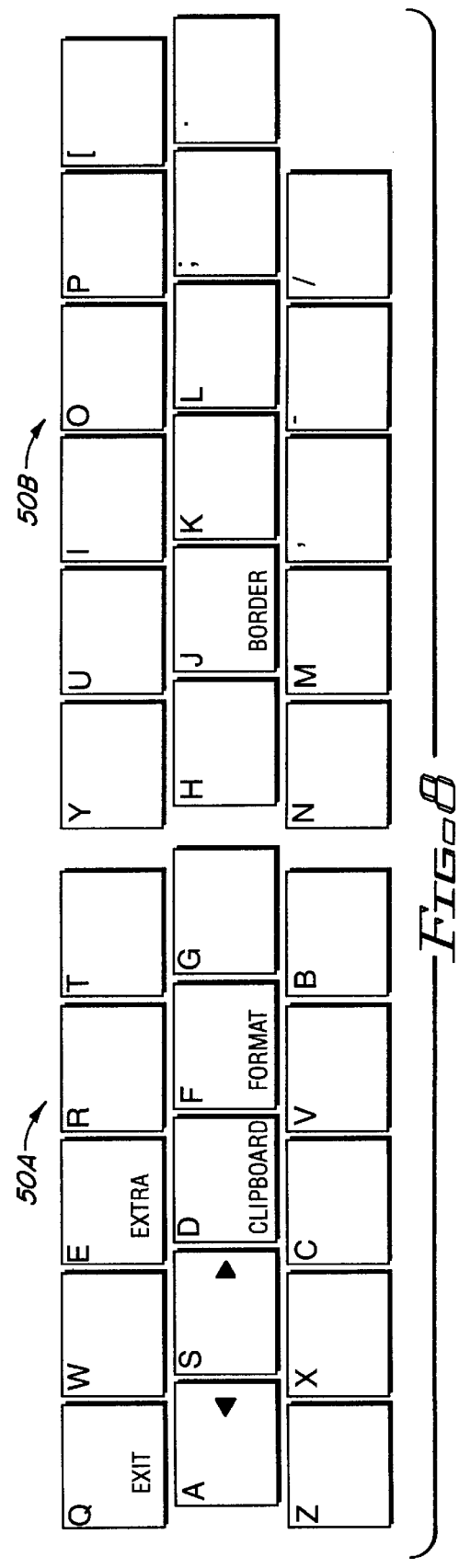

FIG. 7 is a representation of various colors which then can be selected by the operation of the keys on the keyboard 24 corresponding to the display 50A and 50B for this panel. The representation visually displays the different colors indicated in the drawing; so that a color operation or selection readily can be made by the operator of the computer simply by selecting the corresponding key, as shown on the visual display, in a normal manner. This immediately selects the color desired. In the example given, however, it can be seen that the GUI associated with the letter "E" of the keyboard is designated as "EXTRA" for further options. Assume that this is the selection made by the keyboard operator at this time. This selection then causes the next display in the hierarchy to be brought up on the visual display 26 of the keyboard system of FIG. 1. This is shown in FIG. 8. The screen of FIG. 8 only includes a small number of selections; and if none of these are appropriate, the key displaying the GUI "EXTRA" key, "E" on the keyboard 24, is operated to switch the system back to the GUI display of FIG. 6, which involves a larger number of selections.

With the screen of FIG. 6 again being displayed, the operator then may select any one of the desired tasks. Assume that the selection is for the "FONT" in which the text or a portion of the text is to be displayed. As is apparent from an examination of FIG. 6, this GUI indication is associated with the key for the letter "F" of the keyboard 24 of the computer system shown in FIG. 1. Depression of the "F" key then causes the next hierarchy panel to be displayed in accordance with the protocol of FIG. 2 on the display 26 of FIG. 1.

Figure 9:
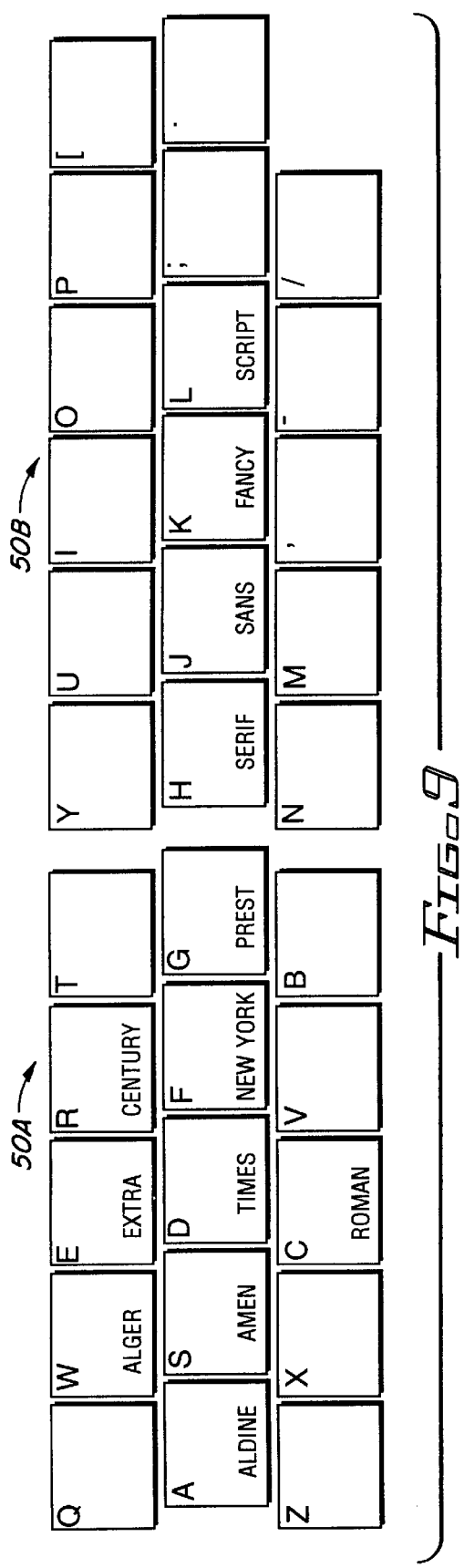
Figure 10:
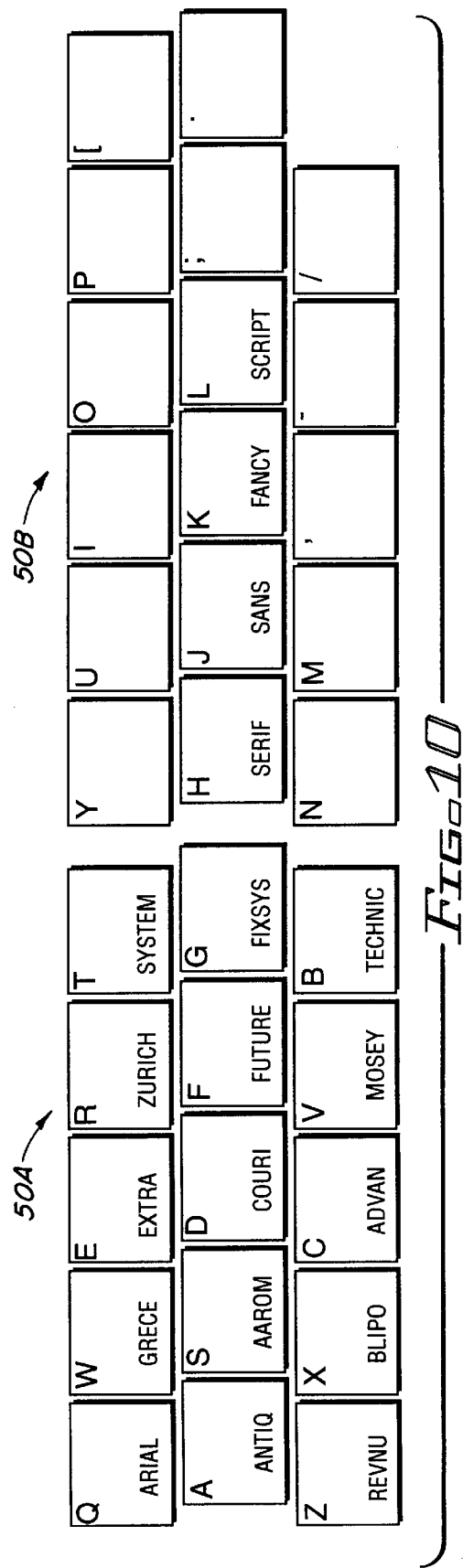
Figure 11:
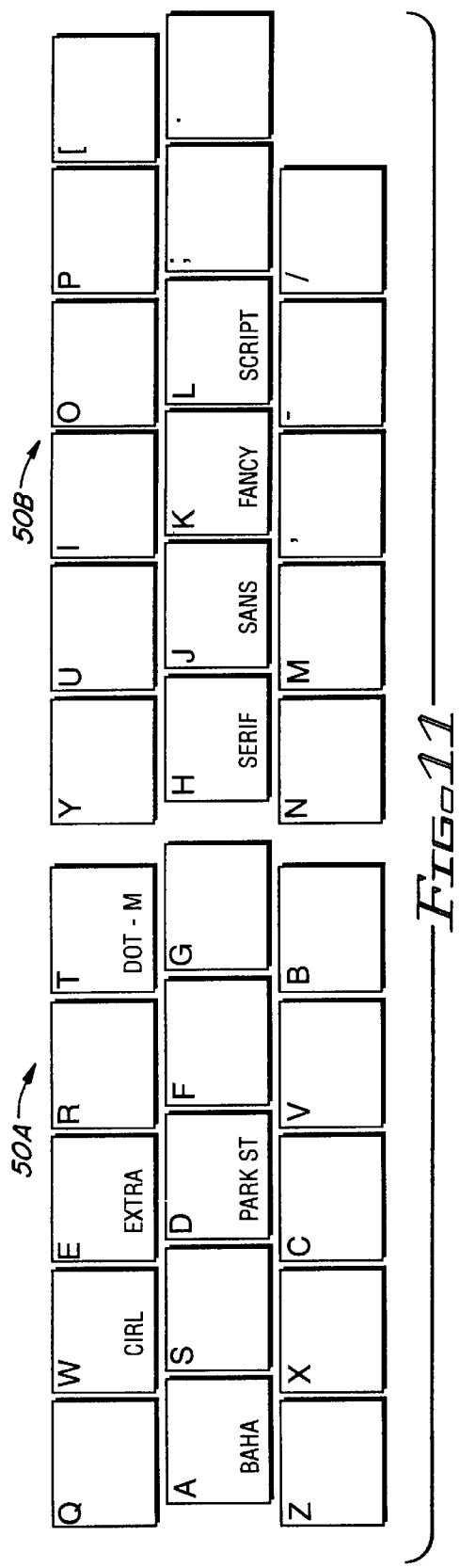

In the interest of economy of number of displays shown in the drawings, this operation is illustrated as producing a display of the right-hand half of any one of panels shown in FIGS. 9, 10 and 11 on the right-hand side. The right-hand side of each of these figures shows four different font selections which are available with the system under consideration. These selections are associated with keys "H", "J", "K" and "L" as shown in the drawings. If the font desired is "SERIF", an examination of FIGS. 9, 10 and 11 shows that this font is selected from this panel displayed at 38 in FIG. 2 and on the display 26 of FIG. 1 by operating the "H" key on the keyboard. When this is done, the selections shown on the left-hand side of the FIG. 9 are available for selection of the particular type style within this broader font characterization. The same operation then is effected to select that type style.

If, when the font selection from the panel of FIG. 6 is displayed as shown in the right-hand side of FIGS. 9, 10 and 11, and the operator chooses the font "SANS" by operation of the key associated with the letter "J", the GUI panel display is the one shown in the left-hand side of FIG. 10. Selection of the particular font then is effected by means of operating the key associated with the displayed font.

Continuing with this same example, assume that the font style "FANCY" is desired. When the display shown in the right-hand side of FIGS. 9, 10 and 11 appears, the operator depresses the key corresponding to "K" to make the appropriate selection. Again, this is a natural straightforward operation of the keyboard 24 to accomplish this selection. Selection of this font style then causes the display shown on the left-hand side (50A) of FIG. 11 to be presented for selection by the operator. It should be noted in conjunction with the font display styles that the GUI not only displays the words corresponding to these fonts, but also may display the words in the particular font style; so that direct visual selection of the particular style readily may be effected. This type of a representation also is made in conjunction with conventional GUI displays; but the manner in which the particular font display is selected is considerably different with the GUI shown in the various FIGS. 3 through 12 above.

Referring once again to FIG. 6, assume that the operator desires to select a particular kind of underlining for incorporation into the text. With the GUI display of FIG. 6 on the screen, the keyboard 24 is operated to select the letter "Y" and depression of the key corresponding to that letter selects the next hierarchy panel, through Step 42 back to Step 36 of FIG. 2, to display that panel at 38 (FIG. 2) on the visual display 26 of FIG. 1.

Figure 12:
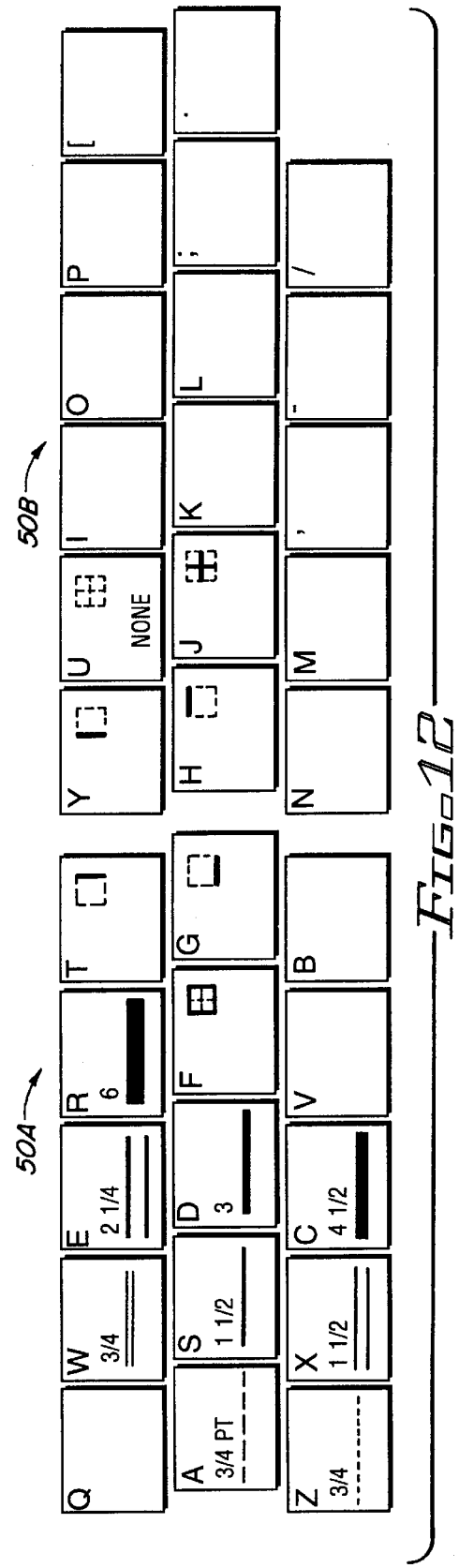

In accordance with the specific sequence of operations in the example selected, this "KIND OF UNDERLINE" selection produces the GUI display shown in FIG. 12. The various lining and underlining options display directly in conjunction with the standard keys of the keyboard in the same manner as all of the other displays which have been described above. Selection of the desired kind of underlining or marking indicated in accordance with the display is effected by operating the key indicated on the unchanging or fixed portion of the GUI display of FIG. 12 to activate the task for execution of the specific underline option chosen.

The foregoing description of the preferred embodiment of the invention is simply representative of the GUI system and method which is disclosed. It should be noted that whenever the display of FIG. 6 is present, selection of the indicated function causes the desired hierarchal panels to be presented for further consideration and operation. Since the manner in which this is done is the same for selection of all of the various options, only a small number of these options have been used in the above illustration in order to demonstrate the manner in which the GUI system functions in conjunction with the keyboard 24 to simplify and speed up the GUI interaction with the computer operator compared with conventional GUI systems.

Figure 13:
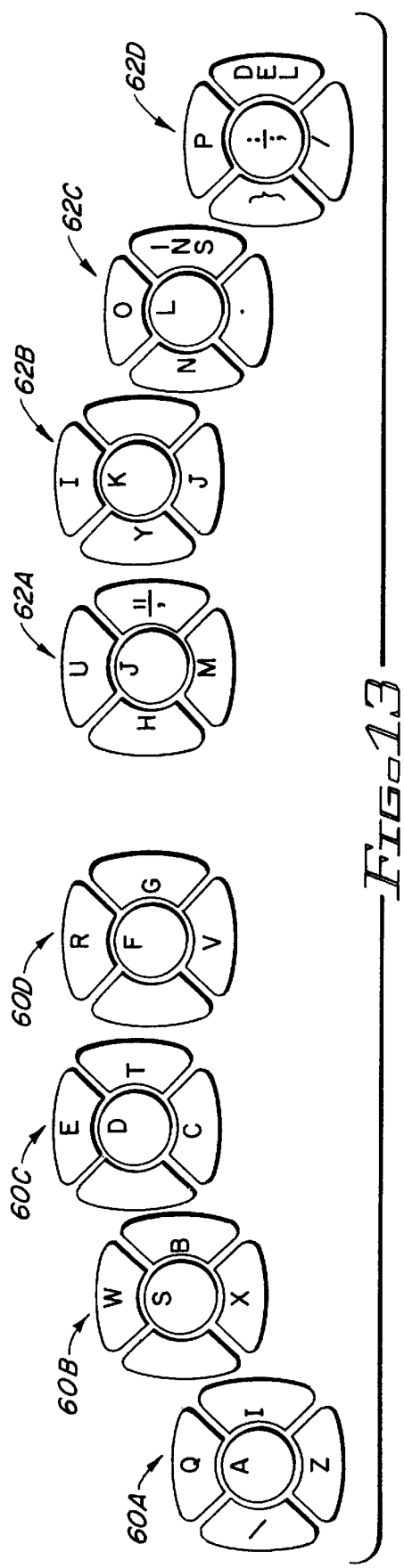
FIG. 13 is an alternative representation of a visual display used in conjunction with a different type of keyboard from the one illustrated in FIGS. 3 through 12.
Figure 14:
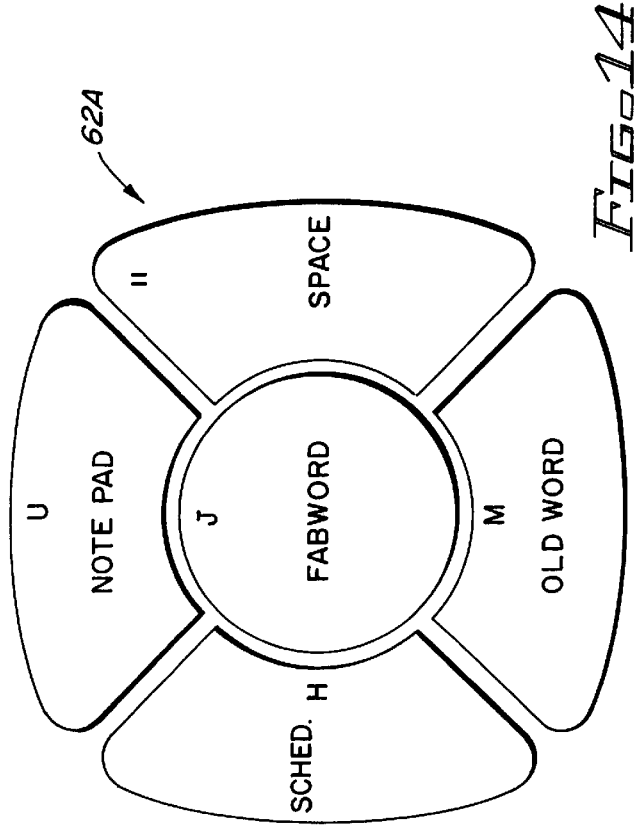
FIG. 14 is an enlarged representation of a portion of the display of FIG. 13 illustrating a feature of applicant's invention.

FIGS. 13 and 14 illustrate an alternative GUI display used in conjunction with keyboards of the type disclosed in the U.S. Pat. No. to Retter No. 4,913,573, which is incorporated herein by reference. FIG. 13 illustrates the finger layouts for the four fingers of each of the left and right hands, respectively. These are shown as four five-key clusters 60 for the left hand, and four similar five-key clusters 62 for the right hand. Each of the four clusters are identified as A, B, C and D for the two groups 60 and 62, for the left hand and right hand, respectively. When this type of keyboard is used, the fixed or unchanging display includes the normal character designations indicated as shown in FIG. 13. This display corresponds with the display shown in FIG. 3 for a standard or conventional keyboard 24. The fixed or unchanging display of the keyboard shown in FIG. 13 throughout all of the different GUI panels, which may be displayed in conjunction with the unchanging display portion 13, operates in the same manner as described above in conjunction with the standard keyboard illustrated in the display shown in FIGS. 3 through 12.

By way of example, an enlarged display of the key cluster 62A is shown in FIG. 14. This display corresponds to a portion of the comparable GUI hierarchy file shown in FIG. 5 for the conventional keyboard. It should be noted that the clusters at each of the other positions 60A through 60D and 62B through 62D include the same information displayed for the standard keyboard in FIG. 5, assuming that the same programs are available in the computer system of FIG. 1, whether the keyboard of U.S. Pat. No. 4,913,573 is used in accordance with FIGS. 13 and 14, or a conventional keyboard of the type used for the GUI of FIGS. 3 to 12 is employed.

In all respects, the GUI displays function in the same manner for the arrangement shown in FIGS. 13 and 14 as for the standard keyboard arrangement of FIGS. 3 through 12. The loading and changing from one panel to another is effected by means of operation of the associated standard key of whatever keyboard is used to display the GUI in an arrangement corresponding to the key arrangement for the keyboard in the manner described previously in conjunction with FIGS. 3 through 12. The sequential operation of the program is indicated in the flow chart of FIG. 2, with this sequence of operation being substantially the same as the operating sequence of a conventional GUI system. The manner of activating the various navigation icons or task icons, however, is different, since for the GUI shown in both of the embodiments of FIGS. 3 through 14, the selection is made by corresponding keys of the keyboard, as indicated on the GUI display on the display screen 26 of the computer system.

From the foregoing it can be seen that the GUI described and shown provides visual landmarks and logical groupings of all of the information. The landmark which is used is universal and literally known like "the back of one's own hand" (the key groupings for the fingers of both the left hand and the right hand of the user). It is readily apparent that instead of a row of command headings arranged in rows or columns, as is the case with conventional graphic user interface systems, the user is presented with command headings arranged in conventional finger groupings for both hands. The finger groupings correspond directly with the particular keyboard used by the user in conjunction with the computer system associated with the GUI.

Whenever one of the keys is selected during the GUI mode of operation, the on-screen schematic immediately appears on the display screen 26 of the computer. The schematic, which has been described above in conjunction with FIGS. 3 through 14, has all of the commands which previously appeared in a column list on a traditional GUI display. The commands, however, now are arranged in logical groupings. For example, if the command heading was "FORMAT", different type styles could be on several fingers. One finger might have styles like "BOLD", "ITALIC", "OUTLINE", etc. as normally operated by the finger of the hand with which these type styles are associated.

When a keyboard of the type illustrated in the pattern of FIGS. 13 and 14 is employed, each finger has five separate keys which may be operated; and logical groupings may be made for each of the different fingers. It is important to note that the GUI which is described and shown here provides the operator with logical visual landmarks to aid in remembering and locating the command. For example, it is easier to remember a command was above the ring finger in an on-screen user schematic than it is to remember it was item 15 in a list of twenty-two items. As a result, with continued use of the GUI described above and shown in the drawings, significantly improved operating speed will occur as the GUI continues to be used by the operator.

It also is readily apparent that whenever the operator spots the desired command on the visual display on the screen, the operator simply depresses or operates the associated key. The on-screen user schematic tells the operator which finger moved, in which direction to cause the execution of the desired command. The result of this is that the GUI of the preferred embodiments described above ultimately allows "muscle memory" to facilitate learning and aids recall. For example, with present GUIs a heading like "STYLE" may be the seventh heading from the left in a row of eight headings; and the command "BOLD" may be the twelfth item in a column. With the GUI interface described herein, this selection may be remembered by the sequence of right ring finger followed by right index finger, up one row (with the keyboard of FIGS. 3 through 12), or up (with the keyboard of FIGS. 13 and 14).

Especially when the GUI used in conjunction with the keyboard layout of the type shown in FIGS. 13 and 14, the interface itself allows logical intuitive relationships between the actual finger motion and the command to be executed. When the keyboard of the type shown in U.S. Pat. No. 4,913,573 is employed, a programmer (and a computer user) knows with certainty which finger moving in which direction will activate any key. This is in marked contrast to a traditional keyboard, the layout representation of which is shown in FIGS. 3 through 12, where often there is no way to determine which fingers an operator might use. For example, with a keyboard layout of the type shown in FIG. 13, the GUI could have one finger with the key activated by the finger moving upwards designated "SUPERSCRIPT" and the key activated by moving the same finger downwards designated "SUBSCRIPT". In a word processor program, the little fingers (60A and 62D) might adjust the right and left margins by right and left movements of the corresponding finger. Whether the improved keyboard of the layout shown in FIGS. 13 and 14 and described in U.S. Pat. No. 4,913,573 is used or a standard keyboard having a layout of the type shown in FIGS. 3 through 12 is used, the GUI offers significant levels of operating improvement to the person using the computer system shown in FIG. 1.

One of the more important features of the GUI disclosed in FIGS. 3 through 14 is that it presents only trivial programming changes in the graphical presentations employed with standard, presently available GUI systems. Although what the graphics user sees with the interface of FIGS. 3 through 14 is significantly different, the commands within the computer system and the rest of the program remain unaltered. This new interface does not require any substantive reworking of the basic function of any presently available GUI based software. The interface which is described above and shown in the drawings requires only a different graphical display of the largely unchanged hierarchal command structures already employed by every currently available GUI interface. The changes required are minor programming changes to present the displays in the formats shown, employing all the same command structures already in place.

An important difference between the system and method described above over standard GUI system displays is that the GUI of this invention employs a spatial reference releative to the hands and fingers of the operator. Conventional GUI systems employ absolute spatial references or spatial references relevant to the machine.

The foregoing description of the preferred embodiments of the invention is to be considered as illustrative and not as limiting. For example, various changes will occur to those skilled in the art for performing substantially the same function, in substantially the same way, to achieve substantially the same results without departing from the true scope of the invention as defined in the appended claims.

What is claimed is:

1. A method for controlling the operation of a digital computer system having a memory, a visual display, and a keyboard, said method causing said computer system to perform specific functions in successive repeatable tasks including the steps of:

displaying user schematics of said successive tasks on said visual display in a format which contains in part an unchanging representation of at least a core plurality of keys of said keyboard in the same arrangement used on said keyboard;

indicating, within the unchanging representation of said core plurality of keys, a dynamically changeable function representation of functions to be performed upon operation of a corresponding one of said keys; and changing said changeable representation in a hierarchal sequence and causing said computer system to perform said specific functions in response to successive operations of selected ones of said core plurality of said keys.

2. The method according to claim 1 wherein said unchanging representation of at least a core plurality of the keys of said keyboard includes the display thereon of character labels corresponding to the same character labels appearing on said keyboard for each of the displayed keys.

3. The method according to claim 1 wherein said dynamically changeable function representations include navigation icons and task icons.

4. The method according to claim 1 wherein the unchanging representation of at least a core plurality of the keys of said keyboard as displayed on said visual display includes labels corresponding to the same labels on said keyboard.

5. The method according to claim 4 wherein said dynamically changeable function representations include navigation icons and task icons.

6. The method according to claim 1 wherein said dynamically changeable function representations include navigation icons and task icons.

7. A graphical user interface for use in controlling the operation of a digital computer system having a memory, a visual display and a keyboard, said graphical user interface including in combination:

a digital computer operatively connected to said memory, said visual display and said keyboard; whereupon said digital computer is operated through said keyboard for performing functions structured as a series of hierarchal tasks displayed by said graphical user interface as:
   a primary display of user schematics of said hierarchal tasks on said visual display in a format which contains, in part, an unchanging representation of at least a core plurality of the keys of said keyboard in the same arrangement used on the keys of said keyboard; and
   indicating, within the unchanging representation of said core plurality of said keys, a dynamically changeable function representation of functions to be performed upon operation of a corresponding one of said keys of said keyboard, said changeable function representation changing in a hierarchal sequence in response to successive operations of selected ones of said keys of said keyboard.

8. The system according to claim 7 wherein said graphical user interface displayed on said visual display comprises a displayed representation to the user of the finger and direction of finger movement required to achieve the desired result indicated by the GUI without requiring movement of the hands of the user away from the keyboard.

9. The combination according to claim 8 wherein said unchanging representation of at least a core plurality of the keys of said keyboard includes a representation of character labels which correspond to the same character labels appearing on said keyboard for each of said core plurality of keys.

10. The combination according to claim 9 wherein said system includes a GUI display on said visual display of hierarchal panels representative of navigational operations and task operations for causing said digital computer system to execute automatically the required functions depicted by said GUI upon operation of a key on said keyboard corresponding to the indicated task of the GUI display which is selected.

11. The combination according to claim 7 wherein said system includes a GUI display on said visual display of hierarchal panels representative of navigational operations and task operations for causing said digital computer system to execute automatically the required functions depicted by said GUI upon operation of a key on said keyboard corresponding to the indicated task of the GUI display which is selected.

12. The system according to claim 11 wherein said graphical user interface displayed on said visual display comprises a displayed representation to the user of the finger and direction of finger movement required to achieve the desired result indicated by the GUI without requiring movement of the hands of the user away from the keyboard.

13. The combination according to claim 7 wherein said unchanging representation of at least a core plurality of the keys of said keyboard includes a representation of character labels which correspond to the same character labels appearing on said keyboard for each of said core plurality of keys.

14. The combination according to claim 13 wherein said system includes a GUI display on said visual display of hierarchal panels representative of navigational operations and task operations for causing said digital computer system to execute automatically the required functions depicted by said GUI upon operation of a key on said keyboard corresponding to the indicated task of the GUI display which is selected.

* * * * *